US011346053B2

(12) United States Patent
Sakai et al.

(10) Patent No.: US 11,346,053 B2
(45) Date of Patent: May 31, 2022

(54) SHEET

(71) Applicant: OJI HOLDINGS CORPORATION, Tokyo (JP)

(72) Inventors: Koh Sakai, Chiba (JP); Go Banzashi, Chiba (JP); Hirokazu Sunagawa, Tokyo (JP); Hayato Fushimi, Chiba (JP)

(73) Assignee: OJI HOLDINGS CORPORATON, Tokyo (JP)

( * ) Notice: Subject to any disclaimer, the term of this patent is extended or adjusted under 35 U.S.C. 154(b) by 0 days.

(21) Appl. No.: 16/076,900

(22) PCT Filed: Feb. 9, 2017

(86) PCT No.: PCT/JP2017/004663
§ 371 (c)(1),
(2) Date: Aug. 9, 2018

(87) PCT Pub. No.: WO2017/138589
PCT Pub. Date: Aug. 17, 2017

(65) Prior Publication Data
US 2019/0055697 A1 Feb. 21, 2019

(30) Foreign Application Priority Data

Feb. 10, 2016 (JP) .............................. JP2016-023532

(51) Int. Cl.
| | |
|---|---|
| *D21H 21/20* | (2006.01) |
| *D21H 17/56* | (2006.01) |
| *D21H 17/37* | (2006.01) |
| *D21H 17/41* | (2006.01) |
| *D21H 11/20* | (2006.01) |
| *C08G 69/48* | (2006.01) |
| *C08J 5/18* | (2006.01) |
| *D21H 11/18* | (2006.01) |
| *C08L 1/00* | (2006.01) |
| *C08L 77/00* | (2006.01) |

(52) U.S. Cl.
CPC ............ *D21H 21/20* (2013.01); *C08G 69/48* (2013.01); *C08J 5/18* (2013.01); *C08L 1/00* (2013.01); *C08L 77/00* (2013.01); *D21H 11/18* (2013.01); *D21H 11/20* (2013.01); *D21H 17/37* (2013.01); *D21H 17/41* (2013.01); *D21H 17/56* (2013.01)

(58) Field of Classification Search
None
See application file for complete search history.

(56) References Cited

U.S. PATENT DOCUMENTS

2003/0054167 A1* 3/2003 Wang .................. A61L 24/0042
428/364
2011/0281487 A1* 11/2011 Mukai ...................... B32B 5/02
442/335

FOREIGN PATENT DOCUMENTS

| CN | 102264821 A | 11/2011 |
|---|---|---|
| CN | 102575430 A | 7/2012 |
| CN | 103298861 A | 9/2013 |
| EP | 3 023 542 A1 | 5/2016 |
| JP | 11-338129 A | 12/1999 |
| JP | 2004-158214 A | 6/2004 |
| JP | 2008-303361 A | 12/2008 |
| JP | 2010-168572 A | 8/2010 |
| JP | 2010-168716 A | 8/2010 |
| JP | 2013-064029 A | 4/2013 |
| JP | 2013-127141 A | 6/2013 |
| JP | 2014-095008 A | 5/2014 |
| WO | 2014/192634 A1 | 12/2014 |

OTHER PUBLICATIONS

International Search Report and Written Opinion dated May 9, 2017 issued by the International Searching Authority in PCT/JP2017/004663.
International Preliminary Report on Patentability dated Aug. 23, 2018 issued by the International Bureau in PCT/JP2017/004663.
Extended European Search Report dated Sep. 20, 2019, from the European Patent Office in European application No. 17750310.9.
Susanna Ahola et al., "Cellulose nanofibrils-adsorption with poly(amideamine) epichlorohydrin studied by QCM-D and application as a paper strength additive", Cellulose, vol. 15, No. 2, Sep. 20, 2007, pp. 303-314 (12 pages total).
Obokata et al: "The mechanism of wet-strength development of cellulose sheets prepared with polyamideamine-epichlorohydrin (PAE) resin", Colloids and Surfaces A: Physiochemical and Engineering Aspects, vol. 302, No. 1-3, May 11, 2007, pp. 525-531 (7 pages total).
Liangbing Hu et al: "Transparent and conductive paper from nanocellulose fibers", Energy & Environmental Science, vol. 6, No. 2, Jan. 1, 2013, pp. 513-518 (6 pages total).
Maryam Ghanadpour et al: "Phosphorylated Cellulose Nanofibrils: A Renewable Nanomaterial for the Preparation of Intrinsically Flame-Retardant Materials", Biomacromolecules, vol. 16, No. 10, Sep. 30, 2015, pp. 3399-3410 (12 pages total).
Office Action dated Mar. 30, 2020 from the Korean Intellectual Property Office in Korean Application No. 10-2018-7025823.
Office Action dated May 25, 2020 from the European Patent Office in European Application No. 17 750 310.9.
Office Action dated Jul. 2, 2020 by the State Intellectual Property Office of the People's Republic of China in Chinese Application No. 201780010610.1.
Office Action dated Aug. 4, 2020 by the Japan Patent Office in Japanese Application No. 2017-566991.

(Continued)

*Primary Examiner* — Dennis R Cordray
(74) *Attorney, Agent, or Firm* — Sughrue Mion, PLLC

(57) ABSTRACT

It is an object of the present invention is to provide a sheet containing ultrafine cellulose fibers, which is excellent in transparency and water resistance. The present invention relates to a sheet including cellulose fibers having a fiber width of 1000 nm or less, and polyamine polyamide epihalohydrin, wherein the haze of the sheet is 6% or less.

8 Claims, 2 Drawing Sheets

(56) References Cited

OTHER PUBLICATIONS

Office Action dated Oct. 23, 2020 from the Korean Intellectual Property Office in KR Application No. 10-2018-7025823.
Communication dated Mar. 18, 2021, from the China National Intellectual Property Administration in Chinese application No. 201780010610.1.
Office Action dated May 18, 2021, issued by the Japanese Patent Office in Japanese application No. 2017-566991.
Office Action dated Sep. 1, 2021 by China National Intellectual Property Administration in Chinese English Application No. 201780010610.1

* cited by examiner

[Figure 1]
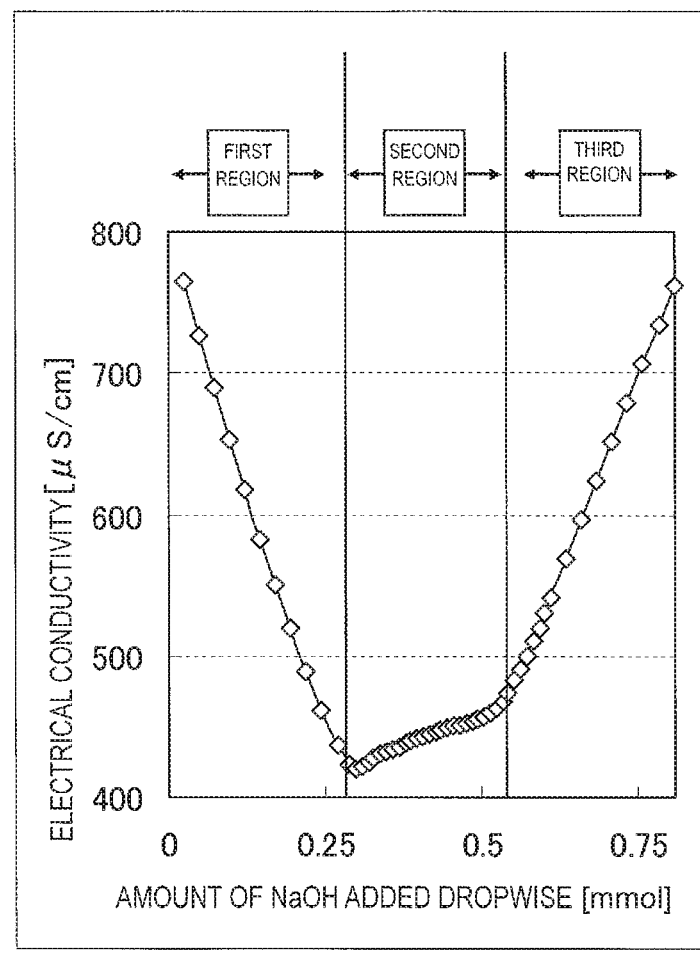

[Figure 2]
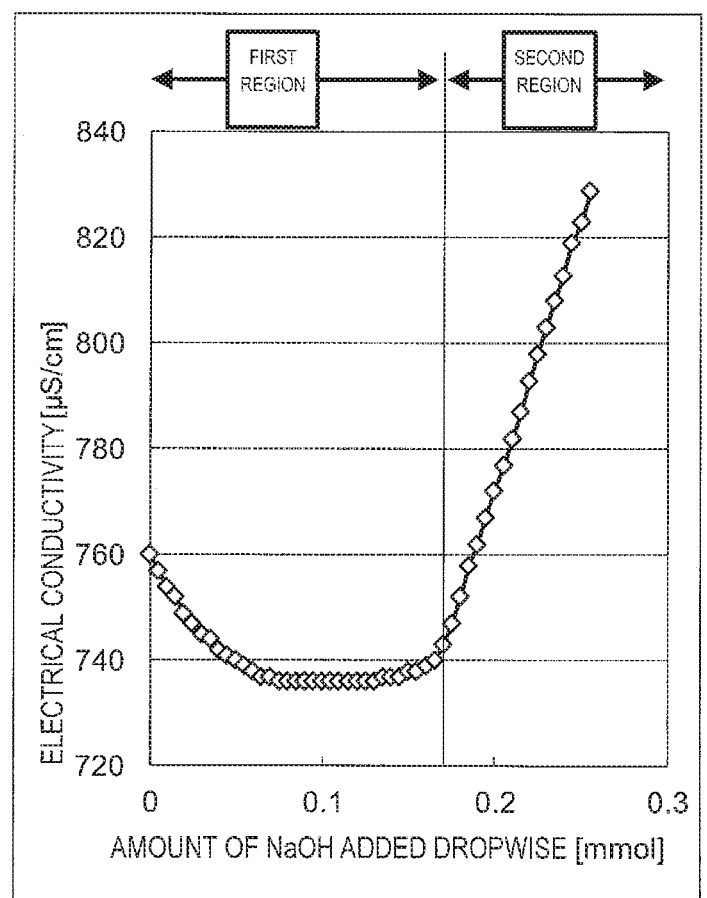

SHEET

CROSS REFERENCE TO RELATED APPLICATIONS

This application is a National Stage of International Application No. PCT/JP2017/004663 filed Feb. 9, 2017, claiming priority based on Japanese Patent Application No. 2016-023532 filed Feb. 10, 2016.

TECHNICAL FIELD

The present invention relates to a sheet. Specifically, the present invention relates to a sheet including ultrafine cellulose fibers.

BACKGROUND ART

In recent years, because of enhanced awareness of alternatives to petroleum resources and environmental consciousness, there has been a focus on materials utilizing reproducible natural fibers. Among natural fibers, cellulose fibers having a fiber diameter of 10 μm or more and 50 μm or less, in particular, wood-derived cellulose fibers (pulp) have been widely used mainly as paper products so far.

As for the cellulose fibers, ultrafine cellulose fibers, which have a fiber diameter of 1 μm or less, are also known. There are also developed a sheet formed from such ultrafine cellulose fibers, and a composite sheet including a sheet containing ultrafine cellulose fibers and a resin. It is known that such a sheet containing ultrafine cellulose fibers and such a composite sheet are remarkably increased in the contact between fibers and thus significantly enhanced in tensile strength and the like. There is also studied about an increase in strength of a sheet by addition of various additives (for example, Patent Documents 1 to 3).

Patent Documents 1 and 2 disclose a sheet including ultrafine cellulose fibers and a polyacrylamide-based resin. In Patent Document 1, an anionic polyacrylamide resin is mainly used as the polyacrylamide-based resin. Patent Document 2 discloses a sheet including ultrafine cellulose fibers having a carboxyl group, a nonionic polyacrylamide resin, and the like. Patent Document 3 discloses a sheet including ultrafine cellulose fibers having a carboxyl group, and a cationic aqueous resin. As the cationic aqueous resin, a polyamine polyamide epihalohydrin resin, a polyamine epihalohydrin resin and a polyacrylamide resin are here used.

PRIOR ART DOCUMENTS

Patent Documents

Patent Document 1: International Publication No. WO 2014/192634
Patent Document 2: JP-A-2014-095008
Patent Document 3: JP-A-2008-303361

SUMMARY OF INVENTION

Object to be Solved by the Invention

As described above, there is proposed to enhance mechanical strength of a sheet by addition of resins to a sheet containing ultrafine cellulose fibers. In Patent Document 3, there is proposed to enhance water resistance of a sheet by addition of a particular cationic aqueous resin.

However, the sheets containing ultrafine cellulose fibers, obtained in Patent Documents 1 and 2, are not sufficient in water resistance in some cases, and thus the improvement has been desired. It has also been found by studies of the present inventors that the sheet containing ultrafine cellulose fibers, obtained in Examples of Patent Document 3, is deteriorated in transparency. That is, sheets containing ultrafine cellulose fibers, obtained in the prior art, do not achieve both of water resistance and transparency, and thus the improvement has been desired.

In order to solve the problems of the prior art, the present inventors have then advanced studies for the purpose of providing a sheet having a high transparency, which is a sheet containing ultrafine cellulose fibers, enhanced in water resistance.

Means for Solving the Object

The present inventors have made intensive studies in order to solve the above problem, and as a result, a sheet excellent in transparency and water resistance is obtained by adding a cationic resin to a sheet including cellulose fibers having a fiber width of 1000 nm or less, and furthermore controlling the haze of the sheet to a predetermined value or less.

Specifically, the present invention is configured as follows.

[1] A sheet comprising cellulose fibers having a fiber width of 1000 nm or less, and a cationic resin, wherein the haze of the sheet is 6% or less.
[2] The sheet according to [1], wherein the cationic resin comprises polyamine polyamide epihalohydrin.
[3] The sheet according to [1] or [2], wherein, when the mass of the sheet immersed in ion-exchanged water for 24 hours is defined as W and the mass of the sheet subjected to humidity conditioning at 23° C. and a relative humidity of 50% for 24 hours is defined as $W_d$, the water absorption rate represented by $(W-W_d)/W_d \times 100$ is 5000% or less.
[4] The sheet according to any one of [1] to [3], wherein the total light transmittance is 85% or more.
[5] The sheet according to any one of [1] to [4], wherein the tensile elastic modulus of the sheet subjected to humidity conditioning at 23° C. and a relative humidity of 50% for 24 hours is 5 GPa or more.
[6] The sheet according to any one of [1] to [5], wherein the sheet comprises 0.1 parts by mass or more and 15 parts by mass or less of the polyamine polyamide epihalohydrin per 100 parts by mass of the cellulose fibers.
[7] The sheet according to any one of [1] to [6], further comprising a polyacrylamide-based resin.
[8] The sheet according to [7], wherein the polyacrylamide-based resin is an ionic polyacrylamide-based resin.
[9] The sheet according to [7], wherein the polyacrylamide-based resin is a nonionic polyacrylamide-based resin.
[10] The sheet according to any one of [1] to [9], wherein the cellulose fibers have an ionic functional group.
[11] The sheet according to [10], wherein the ionic functional group is a phosphoric acid group.
[12] The sheet according to any one of [1] to [11], wherein the yellowness of the sheet measured in accordance with JIS K 7373 is 1.2 or less.
[13] The sheet according to any one of [1] to [12], comprising a particulate resin.

Advantageous Effects of Invention

According to the present invention, sheets excellent in transparency and water resistance can be obtained. The sheet of the present invention is a sheet having the above properties, and thus can be applied to various applications.

BRIEF DESCRIPTION OF DRAWINGS

FIG. 1 is a graph showing the relationship between the amount of NaOH added dropwise to a fiber raw material having a phosphoric acid group, and electrical conductivity.

FIG. 2 is a graph showing the relationship between the amount of NaOH added dropwise to a fiber raw material having a carboxyl group, and electrical conductivity.

EMBODIMENT OF CARRYING OUT THE INVENTION

Hereinafter, the present invention will be described in detail. The description for components described below will be based on representative embodiments or specific examples; however, the present invention will not be limited to such embodiments.

(Sheet)

The present invention relates to a sheet including cellulose fibers having a fiber width of 1000 nm or less, and a cationic resin. The sheet of the present invention preferably relates to a sheet including cellulose fibers having a fiber width of 1000 nm or less, and polyamine polyamide epihalohydrin. The haze of the sheet of the present invention is 6% or less.

The sheet of the present invention has the above-described structure, and therefore exerts excellent water resistance in the form of a sheet having a high transparency. The sheet of the present invention has not only transparency and water resistance, but also sufficient strength, and has sufficient tensile strength and tensile elastic modulus.

The haze of the sheet of the present invention is 6% or less, the haze is preferably 5% or less, more preferably 3% or less, further preferably 2% or less, and particularly preferably 1.5% or less, and the haze may also be 0%. In the present invention, when the haze of the sheet is set within the range described above, the transparency of the sheet can be further enhanced. The haze of the sheet is a value measured with a haze meter (HM-150, manufactured by Murakami Color Research Laboratory Co., Ltd.) in accordance with JIS K7136.

The sheet of the present invention is low in water absorption rate. A low water absorption rate of the sheet in the present invention means that the sheet is excellent in water resistance. In the present invention, when the mass of the sheet immersed in ion-exchanged water for 24 hours is defined as W and the mass of the sheet subjected to humidity conditioning at 23° C. and a relative humidity of 50% for 24 hours is defined as $W_d$, the water absorption rate (%) is a value represented by $(W-W_d)/W_d \times 100$. The water absorption rate is preferably 5000% or less, more preferably 3000% or less, further preferably 1000% or less, even further preferably 500% or less, and particularly preferably 300% or less. It is to be noted that the water absorption rate of the sheet may also be 0%.

The sheet of the present invention is also characterized by being high in total light transmittance. The total light transmittance of the sheet of the present invention is preferably 85% or more, more preferably 89% or more, and further preferably 91% or more. In the present invention, when the total light transmittance of the sheet is set within the range described above, the transparency of the sheet can be further enhanced. The total light transmittance of the sheet is a value measured with a haze meter (HM-150, manufactured by Murakami Color Research Laboratory Co., Ltd.) in accordance with JIS K 7361.

The yellowness of the sheet of the present invention is preferably 2.5 or less, more preferably 1.5 or less, further preferably 1.2 or less, and particularly preferably 1.0 or less. The yellowness is a value measured in accordance with JIS K 7373, and when the yellowness is set within the range described above, the transparency of the sheet can be further enhanced and a high-quality sheet can be obtained.

The tensile strength of the sheet of the present invention is preferably 50 MPa or more, more preferably 70 MPa or more, and further preferably 75 MPa or more. The upper limit value of the tensile strength is not particularly limited, but it can be, for example, 500 MPa or less.

The tensile elastic modulus of the sheet of the present invention is preferably 5 GPa or more, more preferably 6 GPa or more, and further preferably 7 GPa or more. The upper limit value of the tensile elastic modulus is not particularly limited, but it can be, for example, 50 GPa or less.

The degree of elongation of the sheet of the present invention is preferably 1% or more, more preferably 2% or more, and further preferably 3% or more. The degree of elongation of the sheet is preferably 20% or less and more preferably 15% or less.

Each of the tensile strength, tensile elastic modulus, and degree of elongation is a value measured with a tensile testing machine Tensilon (manufactured by A&D Company, Limited) in accordance with JIS P 8113 after the sheet is placed in conditions of 23° C. and a relative humidity of 50% for 24 hours. In the present description, conditions of 23° C. and a relative humidity of 50% correspond to humidity conditioning conditions (drying conditions), and the tensile strength, tensile elastic modulus, and degree of elongation are the tensile strength, tensile elastic modulus, and degree of elongation after standing in humidity conditioning conditions for 24 hours, respectively.

The density of the sheet of the present invention is preferably 1.0 g/cm³ or more, more preferably 1.2 g/cm³ or more, and further preferably 1.5 g/cm³ or more. The density of the sheet is preferably 7.0 g/cm³ or less. The density of the sheet is calculated from the basis weight and thickness of the sheet in accordance with JIS P 8118. The basis weight of the sheet can be calculated in accordance with JIS P 8124. It is to be noted that the density of the sheet is the density of one including any component other than ultrafine cellulose fibers.

The thickness of the sheet of the present invention is not particularly limited, but it is preferably 5 μm or more, more preferably 10 μm or more, and further preferably 20 μm or more. The upper limit value of the thickness of the sheet is not particularly limited, but it can be, for example, 1000 μm or less.

(Cationic Resin)

The sheet of the present invention includes a cationic resin. It is considered that the cationic resin is fixed to cellulose fibers to allow hydrophobic portions of the cationic resin to enhance the water resistance of the sheet in the sheet of the present invention.

Examples of the cationic resin can include polyalkylene polyamines or derivatives thereof, such as polyamine polyamide epihalohydrin, polyethylene polyamine and polypropylene polyamine; acrylic polymers having a secondary or tertiary amino group, or a quaternary ammonium group, or copolymers of such acrylamides; polyvinylamines and polyvinylamidines, and dicyan-based cationic compounds typified by dicyandiamide-formalin copolymers; polyamine-based cationic compounds typified by dicyandiamide-polyethylene amine copolymers; epichlorohydrin-dimethylamine copolymers, diallyldimethylammonium-$SO_2$ polycondensates, diallylamine salt-$SO_2$ polycondensates, diallyldimethylammonium chloride polymers, copolymers of allylamine salts, dialkylaminoethyl (meth)acrylate quaternary salt copolymers, acrylamide-diallylamine copolymers, and cationic resins having a 5-membered amidine structure. The cationic resin may be used singly or in combination of two or more kinds thereof.

Among them, the cationic resin is preferably polyamine polyamide epihalohydrin and particularly preferably polyamine polyamide epichlorohydrin from the viewpoint of effectively enhancing both of the water resistance and transparency of the sheet.

The polyamine polyamide epihalohydrin is a cationic thermosetting resin obtained by condensing aliphatic dibasic carboxylic acid or a derivative thereof and polyalkylene polyamine by heating to synthesize polyamide polyamine, and then reacting this polyamide polyamine and epihalohydrin. It is to be noted that the polyamine polyamide epihalohydrin is an aqueous resin and the polyamine polyamide epihalohydrin is preferably added as an aqueous solution in production of the sheet.

Examples of the polyamine polyamide epihalohydrin can include polyamine polyamide epichlorohydrin, polyamine polyamide epibromohydrin and polyamine polyamide epiiodohydrin. Among them, polyamine polyamide epichlorohydrin is preferably used.

The reason why polyamine polyamide epichlorohydrin is particularly preferable is considered as follows. The polyamine polyamide epichlorohydrin is obtained by an addition reaction of a polyamine polyamide resin with epichlorohydrin. The polyamine polyamide resin has a cationic group and a hydrophobic group, and thus can be fixed to cellulose fibers to exert water resistance. The epichlorohydrin also binds to cellulose, and contributes to an enhancement in water resistance. The polyamine polyamide epichlorohydrin obtained by the addition reaction of the polyamine polyamide resin with the epichlorohydrin is an aqueous resin, and the polyamine polyamide epichlorohydrin can be added, as an aqueous solution, to ultrafine cellulose fibers, thereby allowing water resistance to be exerted without any inhibition of the transparency of ultrafine cellulose fibers.

The content of the polyamine polyamide epihalohydrin is preferably 0.1 parts by mass or more, more preferably 0.5 parts by mass or more, further preferably 2 parts by mass or more, particularly preferably 5 parts by mass or more per 100 parts by mass of ultrafine cellulose fibers. The content of the polyamine polyamide epihalohydrin is preferably 15 parts by mass or less, more preferably 12 parts by mass or less. When the content of the polyamine polyamide epihalohydrin is set within the range described above, the haze value of the sheet can be set with a desired range. In addition, when the content of the polyamine polyamide epihalohydrin is set within the range described above, both of the water resistance and transparency of the sheet can be effectively enhanced.

It is to be noted that the content of the polyamine polyamide epihalohydrin can be analyzed by using, for example, NMR measurement, MS fragment analysis, or UV analysis.

Examples of the structure of the polyamine polyamide epihalohydrin included in the sheet of the present invention include the following structure. In the following structure, A represents a halogen atom.

[Formula 1]

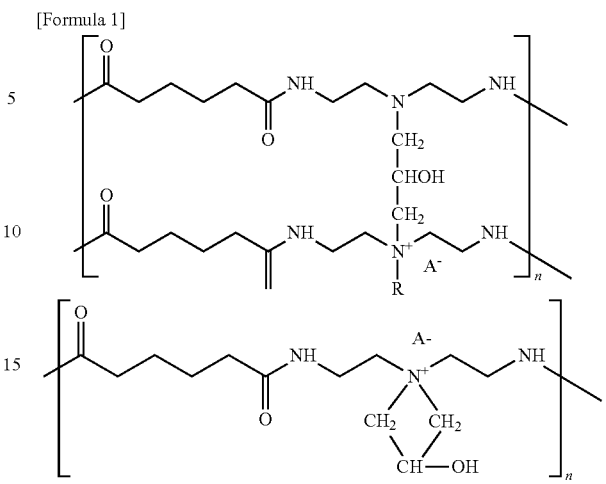

(Ultrafine Cellulose Fibers)

The sheet of the present invention includes cellulose fibers having a fiber width of 1000 nm or less (hereinafter, also referred to as ultrafine cellulose fibers). The content of the ultrafine cellulose fibers included in the sheet is preferably 60% by mass or more, more preferably 70% by mass or more, further preferably 80% by mass or more, particularly preferably 90% by mass or more based on the total mass of the sheet.

Although there is no particular restriction on a cellulose fiber raw material for yielding ultrafine cellulose fibers, pulp is preferably used from the viewpoint of availability and inexpensiveness. The pulp may be selected from wood pulp, non-wood pulp, and deinked pulp. Examples of wood pulp include chemical pulp, such as leaf bleached kraft pulp (LBKP), needle bleached kraft pulp (NBKP), sulfite pulp (SP), dissolving pulp (DP), soda pulp (AP), unbleached kraft pulp (UKP), and oxygen bleached kraft pulp (OKP). Further, included are, but not particularly limited to, semichemical pulp, such as semi-chemical pulp (SCP), and chemi-ground wood pulp (CGP); and mechanical pulp, such as ground pulp (GP), and thermomechanical pulp (TMP, BCTMP). Examples of non-wood pulp include, but not particularly limited to, cotton pulp, such as cotton linter, and cotton lint; non-wood type pulp, such as hemp, wheat straw, and bagasse; and cellulose isolated from ascidian, seaweed, etc., chitin, chitosan and the like. As a deinked pulp, there is deinked pulp using waste paper as a raw material, but it is not particularly limited thereto. The pulp types according to this embodiment may be used singly, or in combination of two or more types. Among the above-listed pulp types, wood pulp and deinked pulp including cellulose are preferred from the viewpoint of easy availability. Among wood pulp, chemical pulp is preferred because the same has a higher cellulose content to enhance the yield of ultrafine cellulose fibers and decomposition of cellulose in the pulp is mild at the time of ultrafine fiber formation (defibration) to yield ultrafine cellulose fibers having a long fiber length with a high aspect ratio. Among them, kraft pulp and sulfite pulp are most preferably selected. A sheet containing the ultrafine cellulose fibers having a long fiber length with a high aspect ratio tends to exhibit a high strength.

The average fiber width of the ultrafine cellulose fibers is 1000 nm or less as observed with an electron microscope. The average fiber width is preferably 2 nm or more and 1000 nm or less, more preferably 2 nm or more and 100 nm or less, even more preferably 2 nm or more and 50 nm or less, and further preferably 2 nm or more and 10 nm or less, but is not particularly limited thereto. When the average fiber width of the ultrafine cellulose fibers is less than 2 nm, since they are dissolved in water as cellulose molecules, there appears tendency that the physical properties (strength, rigidity, and dimensional stability) as ultrafine cellulose fibers are not expressed sufficiently. It is to be noted that the ultrafine cellulose fibers are, for example, monofibrous cellulose having a fiber width of 1000 nm or less.

The measurement of a fiber width of an ultrafine cellulose fiber by electron microscopic observation is carried out as follows. An aqueous suspension of ultrafine cellulose fibers having a concentration of 0.05% by mass or more and 0.1% by mass or less is prepared, and the suspension is casted onto a hydrophilized carbon film-coated grid as a sample for TEM observation. If the sample contains wide fibers, SEM images of the surface of the suspension casted onto glass may be observed. The sample is observed using electron microscope images taken at a magnification of 1000×, 5000×, 10000×, or 50000× according to the widths of the constituent fibers. However, the sample, the observation conditions, and the magnification are adjusted so as to satisfy the following conditions:

(1) A single straight line X is drawn in any given portion in an observation image, and 20 or more fibers intersect with the straight line X.

(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. 3 or more sets of images of surface portions, which are at least not overlapped, are thus observed, and the widths of the fibers intersecting the straight line X and the straight line Y are read in each image. At least 120 fiber widths (20 fibers×2× 3=120) are thus read. The average fiber width (which may simply be referred to as a "fiber width") of ultrafine cellulose fibers is an average value of the fiber widths thus read.

The fiber length of the ultrafine cellulose fibers is not particularly limited, but it is preferably 0.1 μm or more and 1000 μm or less, more preferably 0.1 μm or more and 800 μm or less, and particularly preferably 0.1 μm or more and 600 μm or less. By making the fiber length within the above-described range, destruction of the crystalline region of the ultrafine cellulose fibers may be suppressed, and the slurry viscosity of the ultrafine cellulose fibers may also be set within an appropriate range. It is to be noted that the fiber length of the ultrafine cellulose fibers can be obtained by an image analysis using TEM, SEM or AFM.

The ultrafine cellulose fibers preferably have a type I crystal structure. In this context, the fact that the ultrafine cellulose fibers have a type I crystal structure may be identified by a diffraction profile obtained from a wide angle X-ray diffraction photograph using CuKα (λ=1.5418 Å) monochromatized with graphite. Specifically, it may be identified based on the fact that there are typical peaks at two positions near 2θ=14° or more and 17° or less, and near 2θ=22° or more and 23° or less.

The percentage of the type 1 crystal structure occupied in the ultrafine cellulose fibers is preferably 30% or more, more preferably 50% or more, and further preferably 70% or more.

The rate of a crystal portion comprised in the ultrafine cellulose fibers is not particularly limited in present invention, but it is preferable to use cellulose, in which the crystallinity obtained by an X-ray diffractometry is 60% or more. The crystallinity is preferably 65% or more, and more preferably 70% or more. In this case, more excellent performance can be expected, in terms of heat resistance and the expression of low linear thermal expansion. The crystallinity can be obtained by measuring an X-ray diffraction profile and obtaining it according to a common method (Seagal et al., Textile Research Journal, Vol. 29, p. 786, 1959).

In the present invention, the ultrafine cellulose fibers are preferably fibers having an ionic functional group, and the ionic functional group is here preferably an anionic functional group (hereinafter, also referred to as anionic group). The anionic group is, for example, preferably at least one selected from a phosphoric acid group or a substituent derived from a phosphoric acid group (which may simply be referred to as a phosphoric acid group), a carboxyl group or a substituent derived from a carboxyl group (which may simply be referred to as a carboxyl group), and a sulfone group or a substituent derived from a sulfone group (which may simply be referred to as a sulfone group), more preferably at least one selected from a phosphoric acid group and a carboxyl group, and particularly preferably a phosphoric acid group.

The ultrafine cellulose fibers preferably have phosphoric acid groups or substituents derived from the phosphoric acid group. The phosphoric acid group is a divalent functional group corresponding to a phosphoric acid from which a hydroxyl group is removed. Specifically, it is represented by —PO$_3$H$_2$. The substituents derived from the phosphoric acid group include substituents, such as groups that phosphoric acid groups are condensation-polymerized into, salts of the phosphoric acid group and phosphoric acid ester groups, and they may be an ionic substituent or nonionic substituent.

In the present invention, the phosphoric acid group or a substituent derived from the phosphoric acid group may be a substituent represented by Formula (1) below:

[Formula 2]

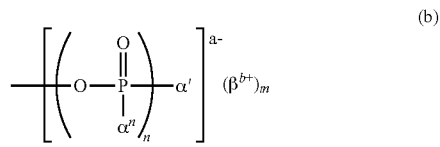

(b)

In Formula (1), a, b, m and n each independently represent an integral number (provided that a=b×m); $\alpha^n$ (n is an integral number from 1 to n) and $\alpha'$ each independently represent R or OR. R is a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an aromatic group, or a derivative group thereof; β is a monovalent or higher valent cation consisting of organic matter or inorganic matter.

<Phosphoric Acid Group Introduction Step>

The phosphoric acid group introduction step may be performed by allowing at least one selected from a compound having phosphoric acid groups and salts thereof (hereinafter, referred to as a "phosphorylating reagent" or "compound A") to react with the fiber raw material including cellulose. Such a phosphorylating reagent may be mixed into the fiber raw material in a dry or wet state, in the form of a powder or an aqueous solution. In another example, a powder or an aqueous solution of the phosphorylating reagent may be added into slurry of the fiber raw material.

The phosphoric acid group introduction step may be performed by allowing at least one selected from a compound having phosphoric acid groups and salts thereof (a phosphorylating reagent or compound A) to react with the fiber raw material including cellulose. It is to be noted that this reaction may be performed in the presence of at least one selected from urea and derivatives thereof (hereinafter, referred to as "compound B").

One example of the method for allowing compound A to act on the fiber raw material in the presence of compound B includes a method of mixing the fiber raw material in a dry or wet state with a powder or an aqueous solution of compound A and compound B. Another example thereof includes a method of adding a powder or an aqueous solution of compound A and compound B to slurry of the fiber raw material. Among them, a method of adding an aqueous solution of compound A and compound B to the fiber raw material in a dry state, or a method of adding a powder or an aqueous solution of compound A and compound B to the fiber raw material in a wet state is preferred because of the high homogeneity of the reaction. Compound A and compound B may be added at the same time or may be added separately.

Alternatively, compound A and compound B to be subjected to the reaction may be first added as an aqueous solution, which is then compressed to squeeze out redundant chemicals. The form of the fiber raw material is preferably a cotton-like or thin sheet form, though the form is not particularly limited thereto.

The compound A used in the present embodiment is at least one selected from a compound having phosphoric acid groups and salts thereof.

Examples of the compound having a phosphoric acid group include, but are not particularly limited to, phosphoric acid, lithium salts of phosphoric acid, sodium salts of phosphoric acid, potassium salts of phosphoric acid, and ammonium salts of phosphoric acid. Examples of the lithium salts of phosphoric acid include lithium dihydrogen phosphate, dilithium hydrogen phosphate, trilithium phosphate, lithium pyrophosphate, and lithium polyphosphate. Examples of the sodium salts of phosphoric acid include sodium dihydrogen phosphate, disodium hydrogen phosphate, trisodium phosphate, sodium pyrophosphate, and sodium polyphosphate. Examples of the potassium salts of phosphoric acid include potassium dihydrogen phosphate, dipotassium hydrogen phosphate, tripotassium phosphate, potassium pyrophosphate, and potassium polyphosphate. Examples of the ammonium salts of phosphoric acid include ammonium dihydrogen phosphate, diammonium hydrogen phosphate, triammonium phosphate, ammonium pyrophosphate, and ammonium polyphosphate.

Among them, from the viewpoints of high efficiency in introduction of the phosphoric acid group, an improving tendency of the defibration efficiency in a defibration step described below, low cost, and industrial applicability, phosphoric acid, sodium phosphate, potassium phosphate, and ammonium phosphate are preferred. Sodium dihydrogenphosphate, or disodium hydrogenphosphate is more preferred.

Further, since the uniformity of the reaction is improved and the efficiency in introduction of a phosphoric acid group is enhanced, the Compound A is preferably used as an aqueous solution. Although there is no particular restriction on the pH of an aqueous solution of the Compound A, the pH is preferably 7 or lower because the efficiency in introduction of a phosphoric acid group is high, and more preferably 3 to 7 from the viewpoint of suppression of hydrolysis of a pulp fiber. The pH of an aqueous solution of the Compound A may be adjusted, for example, by using, among compounds having a phosphoric acid group, a combination of an acidic one and an alkaline one, and changing the quantitative ratio thereof. The pH of an aqueous solution of Compound A may also be adjusted by adding an inorganic alkali or an organic alkali to an acidic compound among compounds having a phosphoric acid group.

The amount of the compound A added to the fiber raw material is not particularly limited, but when the amount of the compound A added is converted to the amount of phosphorus atoms, the amount of phosphorus atoms added to the fiber raw material (absolute dry mass) is preferably 0.5% by mass or more and 100% by mass or less, more preferably 1% by mass or more and 50% by mass or less, and the most preferably 2% by mass or more and 30% by mass or less. When the amount of phosphorus atoms added to the fiber raw material is within the above range, the yield of ultrafine cellulose fibers may be more improved. When the amount of phosphorus atoms added to the fiber raw material exceeds 100% by mass, the effect of improving the yield levels off, and the cost of the Compound A used increases. On the other hand, by adjusting the amount of phosphorus atoms added to the fiber raw material not less than the lower limit, the yield may be increased.

Examples of the compound B used in the present embodiment include urea, biuret, 1-phenyl urea, 1-benzyl urea, 1-methyl urea, 1-ethyl urea and the like.

The compound B, as with the compound A, is preferably used as an aqueous solution. An aqueous solution containing both of the compound A and the compound B dissolved therein is preferably used because of the enhanced homogeneity of the reaction. The amount of the compound B added to the fiber raw material (absolute dry mass) is preferably 1% by mass or more and 500% by mass or less, more preferably 10% by mass or more and 400% by mass or less, further preferably 100% by mass or more and 350% by mass or less, and particularly preferably 150% by mass or more and 300% by mass or less.

The reaction system may contain an amide or an amine in addition to the compound A and the compound B. Examples of the amide include formamide, dimethylformamide, acetamide, and dimethylacetamide. Examples of the amine include methylamine, ethylamine, trimethylamine, triethylamine, monoethanolamine, diethanolamine, triethanolamine, pyridine, ethylenediamine, and hexamethylenediamine. Among them, particularly, triethylamine is known to work as a favorable reaction catalyst.

In the phosphoric acid group introduction step, it is preferred to perform heat treatment. For the temperature of heat treatment, it is preferred to select a temperature that allows an efficient introduction of phosphoric acid groups while suppressing the thermal decomposition or hydrolysis reaction of fibers. Specifically, the temperature is preferably 50° C. or more and 300° C. or less, more preferably 100° C. or more and 250° C. or less, and further preferably 130° C. or more and 200° C. or less. In addition, a vacuum dryer, an infrared heating device, or a microwave heating device may be used for heating.

Upon heat treatment, if the time for leaving the fiber raw material to stand still gets longer while the fiber raw material slurry to which the compound A is added contains water, as drying advances, water molecules and the compound A dissolved therein move to the surface of the fiber raw material. As such, there is a possibility of the occurrence of unevenness in the concentration of the compound A in the fiber raw material, and the introduction of phosphoric acid groups to the fiber surface may not progress uniformly. In order to suppress the occurrence of unevenness in the concentration of the compound A in the fiber raw material due to drying, the fiber raw material in the shape of a very thin sheet may be used, or a method may be employed of heat drying or vacuum drying the fiber raw material while kneading or stirring with the compound A using a kneader or the like.

As a heating device used for heat treatment, a device capable of always discharging moisture retained by slurry or moisture generated by an addition reaction of phosphoric acid groups with hydroxy groups of the fiber to the outside of the device system is preferred, and for example, forced convection ovens or the like are preferred. By always discharging moisture in the device system, in addition to being able to suppress a hydrolysis reaction of phosphoric acid ester bonds, which is a reverse reaction of the phosphoric acid esterification, acid hydrolysis of sugar chains in the fiber may be suppressed as well, and ultrafine fibers with a high axial ratio can be obtained.

The time for heat treatment is, although affected by the heating temperature, preferably 1 second or more and 300 minutes or less, more preferably 1 second or more and 1000 seconds or less, and further preferably 10 seconds or more and 800 seconds or less after moisture is substantially removed from the fiber raw material slurry. In the present invention, by setting the heating temperature and heating time within an appropriate range, the amount of phosphoric acid groups introduced can be set within a preferred range.

The amount of phosphoric acid groups introduced is, per 1 g (mass) of the ultrafine cellulose fibers, preferably 0.1 mmol/g or more and 3.65 mmol/g or less, more preferably 0.14 mmol/g or more and 3.5 mmol/g or less, further preferably 0.2 mmol/g or more and 3.2 mmol/g or less, particularly preferably 0.4 mmol/g or more and 3.0 mmol/g or less, and the most preferably 0.6 mmol/g or more and 2.5 mmol/g or less. By setting the amount of phosphoric acid groups introduced within the above-described range, it may become easy to make the fiber raw material ultrafine, and the stability of the ultrafine cellulose fibers can be enhanced. In addition, by making the amount of phosphoric acid groups introduced within the above-described range, although it is easy to make the fiber raw material ultrafine, the hydrogen bonds between the ultrafine cellulose fibers may also remain, and the expression of good strength can be expected.

The amount of phosphoric acid groups introduced into a fiber raw material may be measured by a conductometric titration method. Specifically, the amount introduced may be measured by performing fibrillation on ultrafine fibers in a defibration treatment step, treating the resulting slurry comprising ultrafine cellulose fibers with an ion exchange resin, and then examining a change in the electrical conductivity while adding an aqueous sodium hydroxide solution.

The conductometric titration confers a curve shown in FIG. 1 as an alkali is added. First, the electrical conductivity is rapidly reduced (hereinafter, this region is referred to as a "first region"). Then, the conductivity starts rising slightly (hereinafter, this region is referred to as a "second region"). Then, the increment of the conductivity is increased (hereinafter, this region is referred to as a "third region"). In short, three regions appear. It is to be noted that the boundary point between the second region and the third region is defined as a point at which the second-order differential value of the conductivity, i.e., the amount of change in the increment (slope) of the conductivity, is maximized. The amount of the alkali required for the first region among these regions is equal to the amount of a strongly acidic group in the slurry used in the titration, and the amount of the alkali required for the second region is equal to the amount of a weakly acidic group in the slurry used in the titration. When condensation of a phosphoric acid group occurs, the weakly acidic group is apparently lost, so that the amount of the alkali required for the second region is decreased as compared with the amount of the alkali required for the first region. On the other hand, the amount of the strongly acidic group agrees with the amount of the phosphorus atom regardless of the presence or absence of condensation. Therefore, the simple term "the amount of the phosphoric acid group introduced (or the amount of the phosphoric acid group)" or "the amount of the substituent introduced (or the amount of the substituent)" refers to the amount of the strongly acidic group. Specifically, the amount (mmol) of the alkali required for the first region in the curve shown in FIG. 1 is divided by the solid content (g) in the slurry to be titrated to determine the amount (mmol/g) of substituents introduced.

The phosphoric acid group introduction step may be performed at least once, but may be repeated multiple times as well. This case is preferred since more phosphoric acid groups are introduced.

<Introduction of Carboxyl Groups>

In the present invention, when the ultrafine cellulose fibers have carboxyl groups, they can be introduced to the fibers by oxidation treatment, such as the TEMPO oxidation treatment, or treatment using a compound having groups derived from a carboxylic acid, derivatives, or acid anhydrides or derivatives thereof.

Although there is no particular restriction on a compound having a carboxyl group, examples thereof include a dicarboxylic acid compound, such as maleic acid, succinic acid, phthalic acid, fumaric acid, glutaric acid, adipic acid, and itaconic acid, and a tricarboxylic acid compound, such as citric acid, and aconitic acid.

Although there is no particular restriction on an acid anhydride of a compound having a carboxyl group, examples thereof include an acid anhydride of a dicarboxylic acid compound, such as maleic anhydride, succinic anhydride, phthalic anhydride, glutaric anhydride, adipic anhydride, and itaconic anhydride.

Although there is no particular restriction on a derivative of a compound having a carboxyl group, examples thereof include an imide of an acid anhydride of a compound having a carboxyl group, and a derivative of an acid anhydride of a compound having a carboxyl group. Although there is no particular restriction on the imide of an acid anhydride of a compound having a carboxyl group, examples thereof include an imide of a dicarboxylic acid compound, such as maleimide, succinimide, and phthalimide.

There is no particular restriction on a derivative of an acid anhydride of a compound having a carboxyl group. Examples thereof include an acid anhydride of a compound having a carboxyl group, at least a part of the hydrogen atoms of which is substituted with a substituent (e.g. an alkyl group, and a phenyl group), such as dimethylmaleic anhydride, diethylmaleic anhydride, and diphenylmaleic anhydride.

<Amount of Carboxyl Groups Introduced>

The amount of carboxyl groups introduced is, per 1 g (mass) of the ultrafine cellulose fibers, preferably 0.1 mmol/g or more, more preferably 0.2 mmol/g or more, further preferably 0.3 mmol/g or more, and particularly preferably 0.5 mmol/g or more. The amount of carboxyl groups introduced is also preferably 3.5 mmol/g or less, more preferably 3.0 mmol/g or less, further preferably 2.5 mmol/g or less, and particularly preferably 2.0 mmol/g or less. By setting the amount of carboxyl groups introduced within the above-described range, it may become easy to make the fiber raw material ultrafine, and the stability of the ultrafine cellulose fibers can be enhanced.

<Cationic Substituent Introduction>

In this embodiment, a cationic substituent may be introduced into ultrafine cellulose fibers as an ionic functional group. For example, a cationic substituent may be introduced into a fiber raw material, by adding a cationizing agent and an alkaline compound to a fiber raw material and causing a reaction.

As the cationizing agent, one having a quaternary ammonium group and having a group reactive with a hydroxy group of cellulose may be used. Examples of the group reactive with a hydroxyl group of cellulose include an epoxy group, a functional group having a structure of halohydrin, a vinyl group, and a halogen group. Specific examples of the cationizing agent include a glycidyltrialkylammonium halide, such as glycidyltrimethylammonium chloride, and 3-chloro-2-hydroxypropyltrimethylammonium chloride, and a halohydrin form compound thereof.

The alkali compound contributes to promotion of a cationization reaction. The alkali compound may be an inorganic alkali compound, such as an alkali metal hydroxide, an alkaline earth metal hydroxide, an alkali metal carbonate, an alkaline earth metal carbonate, an alkali metal phosphate, an alkaline earth metal phosphate; or an organic alkali compound, such as ammonia, an aliphatic amine, an aromatic amine, an aliphatic ammonium, an aromatic ammonium, a heterocyclic compound and a hydroxide, a carbonate, a phosphate, etc. thereof. A measurement of an amount of a cationic substituent introduced may be carried out, for example, by an elemental analysis.

<Alkali Treatment>

In the case of producing the ultrafine cellulose fibers, alkali treatment may be performed between the ionic functional group introduction step and a defibration treatment step mentioned later. Examples of the alkali treatment method include, but are not particularly limited to, a method of immersing the phosphoric acid group-introduced fibers in an alkali solution.

There is no particular restriction on an alkali compound contained in the alkaline solution, and it may be an inorganic alkaline compound or an organic alkali compound. The solvent of the alkaline solution may be either of water and an organic solvent. The solvent is preferably a polar solvent (water, or a polar organic solvent such as alcohol), and more preferably an aqueous solvent containing at least water.

Among alkaline solutions, a sodium hydroxide aqueous solution, or a potassium hydroxide aqueous solution is especially preferred, because of their multiplicity of uses.

The temperature of the alkali solution in the alkali treatment step is not particularly limited, but it is preferably 5° C. or more and 80° C. or less and more preferably 10° C. or more and 60° C. or less.

The immersion time in the alkali solution in the alkali treatment step is not particularly limited, but it is preferably 5 minutes or more and 30 minutes or less and more preferably 10 minutes or more and 20 minutes or less.

The amount of the alkali solution used in the alkali treatment is not particularly limited, but it is preferably 100% by mass or more and 100000% by mass or less and more preferably 1000% by mass and 10000% by mass or less, with respect to the absolute dry mass of the phosphoric acid group-introduced fibers.

In order to reduce the consumption of an alkaline solution in the alkali treatment step, a phosphoric acid group-introduced fiber may be washed with water or an organic solvent before the alkali treatment step. After the alkali treatment, the alkali-treated phosphoric acid group-introduced fiber is preferably washed with water or an organic solvent before the defibration treatment step in order to improve the handling property.

<Defibration Treatment>

The phosphoric acid group-introduced fibers are subject to defibration treatment in a defibration treatment step. In the defibration treatment step, in general, using a defibration treatment device, the defibration treatment is performed on fibers, so as to obtain a slurry comprising ultrafine cellulose fibers. However, the treatment device and the treatment method are not particularly limited thereto.

A high-speed defibrator, a grinder (stone mill-type crusher), a high-pressure homogenizer, an ultrahigh-pressure homogenizer, a high-pressure collision-type crusher, a ball mill, a bead mill, or the like can be used as the defibration treatment apparatus. Alternatively, for example, a wet milling apparatus such as a disc-type refiner, a conical refiner, a twin-screw kneader, an oscillation mill, a homo-mixer under high-speed rotation, an ultrasonic disperser, or a beater may be used as the defibration treatment apparatus. The defibration treatment apparatus is not limited to the above. Examples of a preferred defibration treatment method include a high-speed defibrator, a high-pressure homogenizer, and an ultrahigh-pressure homogenizer, which are less affected by milling media, and free from apprehension of contamination.

For the defibration treatment, the fiber raw material is preferably diluted into slurry using water and an organic solvent each alone or in combination, though the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, hydrogen-binding urea.

The slurry comprising ultrafine cellulose fibers of the present invention may be obtained by temporarily concentrating and/or drying a slurry comprising ultrafine cellulose fibers obtained by a defibration treatment and then performing a defibration treatment again. In this case, the method of concentration and drying is not particularly limited, but examples thereof include a method in which a concentrating agent is added into a slurry comprising ultrafine cellulose fibers, a method using a dehydrator, a press, or a dryer used generally, and the like. Further, publicly known methods, for example as described in WO 2014/024876, WO 2012/107642, and WO 2013/121086, may be used. Also, the slurry comprising ultrafine cellulose fibers may be formed into a sheet. It is also possible that the sheet may be, concentrated, dried, and subjected to a defibration treatment to obtain a slurry comprising ultrafine cellulose fibers again.

As a device used for performing a defibration (pulverization) treatment again after concentrating and/or drying an ultrafine cellulose fiber slurry, a high-speed defibrator, a grinder (stone mill-type grinder), a high-pressure homogenizer, an ultra-high pressure homogenizer, a high-pressure collision type crusher, a ball mill, a bead mill, a disk type refiner, a conical refiner, a twin screw kneader, a vibrating mill, a device for wet milling, such as a high-speed rotating homomixer, an ultrasonic disperser, and a beater, may be used without limitation thereto.

The material comprising ultrafine cellulose fibers with phosphoric acid groups, which has been obtained by the above-mentioned method, is a slurry comprising ultrafine cellulose fibers, and it may be diluted with water to a desired concentration.

(Polyacrylamide-Based Resin)

The sheet of the present invention preferably further includes a polyacrylamide-based resin. Examples of the polyacrylamide-based resin include an acrylamide homopolymer (polyacrylamide) and a copolymer including acrylamide as a main component. Among them, the polyacrylamide-based resin is preferably a copolymer including acrylamide as a main component, and is preferably a copolymer including 50% by mass or more of a unit derived from acrylamide in units constituting such a copolymer. Examples of the monomer copolymerizable with acrylamide include a nonionic monomer, an anionic monomer and a cationic monomer.

Examples of the nonionic monomer can include diacetone acrylamide, alkyl acrylate, hydroxy acrylate, vinyl acetate, styrene and α-methylstyrene.

Examples of the anionic monomer can include organic acid-based monomers, for example, monocarboxylic acid-based monomers (such as, acrylic acid, methacrylic acid and crotonic acid), dicarboxylic acid-based monomers (such as, maleic acid, fumaric acid, itaconic acid and citraconic acid), and sulfonic acid-based monomers having a vinyl group (such as, vinyl sulfonic acid, styrenesulfonic acid and 2-acrylamide-2-methylpropanoic acid). There can also be used salts such as sodium salts and potassium salts of such organic acid-based monomers.

Examples of the cationic monomer can include monomers having a tertiary amino group. Specifically, examples can include (meth)acrylic acid ester derivatives having a tertiary amino group (such as, dialkylaminoethyl (meth)acrylates (such as, dimethylaminoethyl acrylate) and dialkylaminopropyl (meth)acrylates) and (meth)acrylamide derivatives having a tertiary amino group (such as, dialkylaminoethyl (meth)acrylamides, dialkylaminopropyl (meth)acrylamides, and (meth)acrylamide-3-methylbutyldimethylamine). There can also be used salts of the monomers having a tertiary amino group. Examples of the salts include inorganic salts such as hydrochloride and sulfate, and organic salts such as formate and acetate. Furthermore, examples can include quaternary salts obtained by quaternarization of a tertiary amino group with methyl chloride, methyl bromide, benzyl chloride, benzyl bromide, dimethylsulfuric acid, epichlorohydrin, or the like.

As the monomer copolymerizable with acrylamide, a nonionic polyacrylamide-based resin is obtained by use of the nonionic monomer, and an anionic polyacrylamide-based resin is obtained by use of the anionic monomer. Furthermore, as the monomer copolymerizable with acrylamide, a zwitterionic polyacrylamide-based resin is obtained by use of the anionic monomer and the cationic monomer in combination. In the present invention, the polyacrylamide-based resin is preferably an ionic polyacrylamide-based resin and is more preferably an anionic polyacrylamide-based resin.

The content of the polyacrylamide-based resin is preferably 0.1 parts by mass or more, more preferably 0.5 parts by mass or more, further preferably 1 part by mass or more, particularly preferably 5 parts by mass or more per 100 parts by mass of ultrafine cellulose fibers. The content of the polyacrylamide-based resin is preferably 50 parts by mass or less, more preferably 30 parts by mass or less. When the content of the polyacrylamide-based resin is set within the range described above, the water resistance and transparency of the sheet can be enhanced, and furthermore the strength of the sheet can be more effectively enhanced.

It is to be noted that the content of the polyacrylamide-based resin can be analyzed by using, for example, NMR measurement, MS fragment analysis, or UV analysis.

(Other Resin)

The sheet of the present invention can further include, for example, a resin other than the above-described resin.

Examples of such other resin include a thermoplastic resin, a thermosetting resin (cured product obtained by polymerization curing of a precursor of the thermosetting resin by heating), or a photocurable resin (cured product obtained by polymerization curing of a precursor of the photocurable resin by irradiation with radiation (ultraviolet radiation, electron beam, or the like)). The sheet of the present invention can contain such other resin, resulting in a further enhancement in the water resistance of the sheet.

Examples of the thermoplastic resin as such other resin can include, but are not particularly limited, olefin-based resins (such as, polyethylene, polypropylene, ethylene-propylene copolymers, ethylene-α-olefin copolymers, and propylene-α-olefin copolymers), polyvinyl chloride, polyvinylidene chloride, polyvinyl acetate, polyalkyl (meth) acrylate ester polymers or copolymers, styrene-based resins (such as, polystyrene, styrene-acrylonitrile copolymers, styrene-alkyl (meth)acrylate ester copolymers, and ABS resin), polyester-based resins (such as, polyethylene terephthalate, polybutylene terephthalate, polylactic acid, polybutylene succinate, and unsaturated polyester), polyurethane, natural rubber, styrene-butadiene copolymers, acrylonitrile-butadiene copolymers, polyisoprene, polychloroprene, styrene-butadiene-methyl methacrylate copolymers, polyvinyl alcohol, ethylene-vinyl acetate copolymer-saponified products, polyamide-based resins (such as, nylon 6, nylon 66, nylon 10, nylon 11, nylon 12, nylon 610, and polyhexamethylene adipamide), polycarbonate, polyacetal, polyphenylene oxide, and fluororesins. Among them, one preferable example can include polypropylene.

Examples of the thermosetting resin include, but are not particularly limited, epoxy resins, acrylic resins, oxetane resins, phenol resins, urea resins, melamine resins, unsaturated polyester resins, silicon resins, polyurethane resins, silsesquioxane resins, or diallyl phthalate resins.

Examples of the photocurable resin include, but are not particularly limited, epoxy resins, acrylic resins, silsesquioxane resins or oxetane resins exemplified as the above thermosetting resin.

Furthermore, specific examples of resins for use in the thermoplastic resin, the thermosetting resin and the photocurable resin serving as the above-described other resin include those described in JP-A-2009-299043.

In the present invention, the polyamine polyamide epihalohydrin, the polyacrylamide-based resin and such other resin can be added in the form of an emulsion. When such resins are added in the form of an emulsion, particulate resins can be allowed to remain in a part of the resulting sheet, while such an emulsion is molten by, for example, heating. In the present embodiment, it is to be noted that examples of a preferable aspect include an aspect where such other resin is added in the form of an emulsion.

The particle size of the resin emulsion added is preferably 10 nm or more and 10 µm or less, more preferably 10 nm or more and 1 µm or less, further preferably 20 nm or more and 200 nm or less. When the particle size of the resin emulsion is set to 10 µm or less, the transparency of the sheet can be enhanced. On the other hand, when the particle size of the resin emulsion is set to 10 nm or more, the amount of an emulsifier compounded can be decreased to inhibit repelling or the like from occurring on the surface of the sheet. In addition, it becomes easier for the particle size of the resin emulsion to be uniform, and it is also possible to contribute to enhancements in the transparency and mechanical strength of the sheet.

(Optional Component)

The sheet may include optional components other than the above-described components. Examples of optional components can include defoamers, lubricants, ultraviolet absorbing agents, dyes, pigments, stabilizers and surfactants. Examples of optional components also include hydrophilic polymers and organic ions. Such hydrophilic polymers are preferably hydrophilic, oxygen-containing organic compounds (except for the above-described cellulose fibers). The oxygen-containing organic compound is preferably nonfibrous, and such nonfibrous, oxygen-containing organic compounds do not include ultrafine cellulose fibers or thermoplastic resin fibers.

The oxygen-containing organic compound is preferably a hydrophilic, organic compound. Hydrophilic, oxygen-containing organic compounds may improve the strength, density, chemical resistance and the like of the fiber layer. Preferably, hydrophilic, oxygen-containing organic compounds have a SP value of 9.0 or more, for example. In addition, hydrophilic, oxygen-containing organic compounds are preferably such that 1 g or more of the oxygen-containing organic compound is dissolved in 100 ml of ion-exchanged water.

Examples of oxygen-containing organic compounds include: for example, hydrophilic macromolecules, such as polyethylene glycol, polyethylene oxide, casein, dextrin, starches, modified starches, polyvinyl alcohol, modified polyvinyl alcohol (such as, acetoacetylated polyvinyl alcohol), polyethylene oxide, polyvinyl pyrrolidone, polyvinyl methyl ether, polyacrylates, acrylic acid alkyl ester copolymers, urethane-based copolymers and cellulose derivatives (such as, hydroxyethyl cellulose, carboxyethyl cellulose, and carboxymethyl cellulose); and hydrophilic small molecules, such as glycerin, sorbitol and ethylene glycol. Among them, from the viewpoint of the strength, density, chemical resistance and the like of the fiber layer, oxygen-containing organic compounds are preferably polyethylene glycol, polyethylene oxide, glycerin and sorbitol, more preferably at least one selected from polyethylene glycol and polyethylene oxide.

The oxygen-containing organic compound is preferably an organic compound macromolecule having a molecular weight of 50000 or more and 8000000 or less. The molecular weight of the oxygen-containing organic compound is also preferably 100000 or more and 5000000 or less, but for example, it may be a small molecule having a molecular weight of less than 1000.

The content of oxygen-containing organic compounds comprised in the fiber layer is preferably 1 part by mass or more and 40 parts by mass or less, more preferably 10 parts by mass or more and 30 parts by mass or less, more preferably 15 parts by mass or more and 25 parts by mass or less per 100 parts by mass of ultrafine cellulose fibers comprised in the fiber layer. When the content of oxygen-containing organic compounds is set within the range described above, a laminate having high transparency and strength can be formed.

Examples of organic ions can include tetraalkylammonium ions or tetraalkylphosphonium ions. Examples of tetraalkylammonium ions include, for example, tetramethylammonium ions, tetraethylammonium ions, tetrapropylammonium ions, tetrabutylammonium ions, tetrapentylammonium ions, tetrahexylammonium ions, tetraheptylammonium ions, tributylmethylammonium ions, lauryltrimethylammonium ions, cetyltrimethylammonium ions, stearyltrimethylammonium ions, octyldimethylethylammonium ions, lauryldimethylethylammonium ion, didecyldimethylammonium ions, lauryldimethylbenzylammonium ions, and tributylbenzylammonium ions. Examples of tetraalkylphosphonium ions include, for example, a tetramethylphosphonium ions, tetraethylphosphonium ions, tetrapropylphosphonium ions, tetrabutylphosphonium ions, and lauryltrimethylphosphonium ions. In addition, tetrapropylonium ions and tetrabutylonium ions may include tetra-n-propylonium ions and tetra-n-butylonium ions, respectively.

(Method for Producing Sheet)

A production step of a sheet includes a step of obtaining a slurry including cellulose fibers having a fiber width of 1000 nm or less, and a cationic resin, and a step of applying the slurry on a base material or a step of making the slurry into paper. Among them, the production step of a sheet preferably includes a step of applying a slurry including ultrafine cellulose fibers and a cationic resin (which may simply be hereinafter referred to as a slurry) on a base material, and more preferably includes a step of applying a slurry including ultrafine cellulose fibers and polyamine polyamide epihalohydrin on a base material.

In the step of obtaining a slurry, the cationic resin is preferably added in an amount of 0.1 parts by mass or more, more preferably added in an amount of 0.5 parts by mass or more, further preferably added in an amount of 2 parts by mass or more, and particularly preferably added in an amount of 5 parts by mass or more per 100 parts by mass of the cellulose fibers having a fiber width of 1000 nm or less, included in the slurry. The amount of the cationic resin added is preferably 15 parts by mass or less, more preferably 12 parts by mass or less.

In the step of obtaining a slurry, the polyamine polyamide epihalohydrin is preferably added in an amount of 0.1 parts by mass or more, more preferably added in an amount of 0.5 parts by mass or more, further preferably added in an amount of 2 parts by mass or more, particularly preferably added in an amount of 5 parts by mass or more per 100 parts by mass of the cellulose fibers having a fiber width of 1000 nm or less, included in the slurry. In addition, the amount of the polyamine polyamide epihalohydrin added is preferably 15 parts by mass or less, more preferably 12 parts by mass or less. When the amount of the polyamine polyamide epihalohydrin added is set within the range described above, both of the water resistance and transparency of the sheet can be effectively enhanced.

In the step of obtaining a slurry, a polyacrylamide-based resin may be further added. In this case, the polyacrylamide-based resin is preferably added before addition of the polyamine polyamide epihalohydrin. When the polyacrylamide-based resin is added, the polyamine polyamide epihalohydrin is preferably added after the polyacrylamide-based resin is uniformly dispersed. Specifically, the polyamine polyamide epihalohydrin is preferably added after a lapse of 30 seconds or more of addition of the polyacrylamide-based resin.

When the polyacrylamide-based resin is added in the step of obtaining a slurry, the amount of the polyacrylamide-based resin added is preferably 0.1 parts by mass or more, more preferably 0.5 parts by mass or more, further preferably 1 part by mass or more, particularly preferably 5 parts by mass or more per 100 parts by mass of the cellulose fibers having a fiber width of 1000 nm or less, included in the slurry. The amount of the polyacrylamide-based resin added is preferably 50 parts by mass or less, more preferably 30 parts by mass or less.

In the step of obtaining a slurry, the polyamine polyamide epihalohydrin and the polyacrylamide-based resin may be added in the form of a resin emulsion, for example. In the step of obtaining a slurry, a resin except for the polyamine polyamide epihalohydrin and the polyacrylamide-based resin may be added, and the resin may be added in the form of a resin emulsion. When other resin is added, such other resin is preferably added before addition of the polyamine polyamide epihalohydrin.

<Coating Step>

A coating step is a step of applying a slurry including cellulose fibers having a fiber width of 1000 nm or less, and a cationic resin on a base material, drying the slurry to form a sheet, and detaching the sheet from the base material to obtain a sheet. Use of a coating apparatus and a long base material can continuously produce sheets.

The quality of the base material used in the coating step is not particularly limited. Although a base material having higher wettability to the slurry is preferred because shrinkage of the sheet or the like upon drying is suppressed, it is preferred to select one from which a sheet formed after drying can be easily detached. Of these, a resin plate or a metal plate is preferred, without particular limitation. Examples thereof that can be used include resin plates such as acrylic plates, polyethylene terephthalate plates, vinyl chloride plates, polystyrene plates, and polyvinylidene chloride plates; metal plates such as aluminum plates, zinc plates, copper plates, and iron plates; plates obtained by the oxidation treatment of surface thereof; and stainless plates and brass plates.

When the slurry has a low viscosity and spreads on the base material in the coating step, a damming frame is fixed and used on the base material in order to obtain a sheet having a predetermined thickness and basis weight. The quality of the damming frame is not particularly limited, and it is preferred to select ones from which edges of the sheet adhered after drying can be easily detached. Of these, frames formed from resin plates or metal plates are preferred, without particular limitation. Example thereof that can be used include frames formed from resin plates such as acrylic plates, polyethylene terephthalate plates, vinyl chloride plates, polystyrene plates, and polyvinylidene chloride plates; from metal plates such as aluminum plates, zinc plates, copper plates, and iron plates; from plates obtained by the oxidation treatment of surface thereof; and from stainless plates and brass plates Examples of a coater for applying a slurry that can be used include roll coaters, gravure coaters, die coaters, curtain coaters, and air doctor coaters. Die coaters, curtain coaters, and spray coaters are preferred because more even thickness can be provided.

The coating temperature is not particularly limited, and is preferably 20° C. or more and 45° C. or less, more preferably 25° C. or more and 40° C. or less, still more preferably 27° C. or more and 35° C. or less. When the coating temperature is equal to or higher than the lower limit described above, it is possible to easily apply the slurry. When the coating temperature is equal to or lower than the upper limit described above, it is possible to prevent volatilization of the dispersion medium upon coating.

In the coating step, it is preferred to apply the slurry so as to achieve a finished basis weight of the sheet of 10 $g/m^2$ or more and 100 $g/m^2$ or less, preferably 20 $g/m^2$ or more and 50 $g/m^2$ or less. Applying the slurry so as to achieve a basis weight within the above range can give a sheet having strength.

The coating step preferably includes a step of drying the slurry applied on the base material. The drying method is not particularly limited, and any of a contactless drying method and a method of drying the sheet while locking the sheet can be used, or these methods may be combined.

The contactless drying method is not particularly limited, and a method for drying by heating with hot air, infrared, far-infrared, or near-infrared (drying method by heating) or a method for drying in vacuum (vacuum drying method) can be utilized. Although the drying method by heating and the vacuum drying method may be combined, the drying method by heating is usually utilized. The drying with infrared, far-infrared, or near-infrared can be performed using an infrared apparatus, a far-infrared apparatus, or a near-infrared apparatus without particular limitations. The heating temperature for the drying method by heating is not particularly limited, and is preferably 20° C. or more and 150° C. or less, more preferably 25° C. or more and 105° C. or less. At the heating temperature equal to or higher than the lower limit described above, the dispersion medium can be rapidly volatilized. At the heating temperature equal to or lower than the upper limit described above, cost required for the heating can be reduced and the thermal discoloration of the ultrafine cellulose fibers can be suppressed.

<Papermaking Step>

The step of producing the sheet of the present invention may include a step of papermaking from a slurry. Examples of a paper machine in the papermaking step include continuous paper machines such as a fourdrinier paper machine, a cylinder paper machine, and an inclined paper machine, and a multilayer combination paper machine, which is a combination thereof. Known papermaking such as papermaking by hand may be carried out in the papermaking step.

In the papermaking step, the slurry is wire-filtered and dehydrated to obtain a sheet in a wet state. Then, the wet sheet is pressed and dried to obtain a sheet. Upon filtration and dehydration of slurry, filter fabric for filtration is not particularly limited. It is important that ultrafine cellulose fibers and a cationic resin such as polyamine polyamide epihalohydrin do not pass through filter fabric and the filtration speed is not excessively slow. Such filter fabric is not particularly limited, and a sheet comprising organic polymers, woven fabric, or porous membrane is preferred. Preferred examples of organic polymers include, but are not particularly limited to, non-cellulose organic polymers such as polyethylene terephthalate, polyethylene, polypropylene, and polytetrafluoroethylene (PTFE). Specific examples thereof include, but are not particularly limited to, a polytetrafluoroethylene porous membrane having a pore size of 0.1 μm or more and 20 μm or less, for example, 1 μm and woven fabric made of polyethylene terephthalate or polyethylene having a pore size of 0.1 μm or more and 20 μm or less, for example, 1 μm.

A method for producing a sheet from a slurry is not particularly limited, and an example thereof is the method disclosed in WO2011/013567 comprising using a production apparatus. The production apparatus comprises a dewatering section for ejecting slurry containing ultrafine cellulose fibers on the upper surface of an endless belt and dewatering a dispersion medium contained in the ejected slurry to form a web and a drying section for drying the web to produce a fiber sheet. The endless belt is provided across from the dewatering section to the drying section, and the web formed in the dewatering section is transferred to the drying section while being placed on the endless belt.

A dehydration method that can be used is not particularly limited. An example of the method is a dehydration method conventionally used for paper production. A preferred example is a method comprising performing dehydration using a Fourdrinier, cylinder, tilted wire, or the like and then performing dehydration using a roll press. In addition, a drying method is not particularly limited, and an example thereof is a method used for paper production and for example a method using a cylinder dryer, a yankee dryer, hot air drying, a near-infrared heater, or an infrared heater is preferred.

(Laminate)

The present invention may relate to a laminate having a structure where other layer is laminated on the sheet. Such other layer may be provided on both surfaces of the sheet, or may be provided on only one surface of the sheet. Examples of such other layer laminated on at least one surface of the sheet can include a resin layer and an inorganic layer.

<Resin Layer>

A resin layer is a layer that has a natural resin or a synthetic resin as a main component. In this context, the main component refers to a component comprised in 50% by mass or more based on the overall mass of the resin layer. The content of the resin is preferably 60% by mass or more, more preferably 70% by mass or more, further preferably 80% by mass or more, and particularly preferably 90% by mass or more based on the overall mass of the resin layer. It is to be noted that the content of the resin may be 100% by mass or 95% by mass or less.

Examples of natural resins may include, for example, rosin-based resins, such as rosin, rosin ester and hydrated rosin ester.

The synthetic resin is preferably at least one selected from, for example, polycarbonate resins, polyethylene terephthalate resins, polyethylene naphthalate resins, polyethylene resins, polypropylene resins, polyimide resins, polystyrene resins and acrylic resins. Among them, the synthetic resin is preferably at least one selected from polycarbonate resins and acrylic resins, and more preferably a polycarbonate resin. It is to be noted that the acrylic resin is preferably at least any one selected from polyacrylonitrile and poly(meth)acrylate.

Examples of polycarbonate resins, which constitute the resin layer, include, for example, aromatic polycarbonate-based resins and aliphatic polycarbonate-based resins. These specific polycarbonate-based resins are known, and a polycarbonate-based resin described in JP-A-2010-023275 is included, for example.

One resin that constitutes the resin layer may be used alone, or a copolymer obtained by copolymerization or graft polymerization of a plurality of resin components may be used. Alternatively, a plurality of resin components may be mixed by a physical process and used as a blend material.

An adhesive layer may be provided between the sheet and the resin layer, or the sheet and the resin layer may directly adhere to each other without providing an adhesive layer. When an adhesive layer is provided between the sheet and the resin layer, examples of adhesives, which constitute the adhesive layer may include, for example, acrylic resins. Examples of adhesives other than acrylic resins include, for example, vinyl chloride resins, (meth)acrylic acid ester resins, styrene/acrylic acid ester copolymer resins, vinyl acetate resins, vinyl acetate/(meth)acrylic acid ester copolymer resins, urethane resins, silicone resins, epoxy resins, ethylene/vinyl acetate copolymer resins, polyester-based resins, polyvinyl alcohol resins, ethylene vinyl alcohol copolymer resins, rubber-based emulsions such as SBR and NBR, and the like.

When no adhesive layer is provided between the sheet and the resin layer, the resin layer may have an adhesion aid, or the surface of the resin layer may be surface-treated by a hydrophilization treatment or the like.

Examples of the adhesion aid include, for example, compounds containing at least one selected from an isocyanate group, a carbodiimide group, an epoxy group, an oxazoline group, an amino group and a silanol group, and organic silicon compounds. Among them, the adhesion aid is preferably at least one selected from a compound containing an isocyanate group (isocyanate compound) and an organic silicon compound. Examples of the organic silicon compound may include, for example, silane coupling agent condensates and silane coupling agents.

Examples of the surface treatment method can include corona treatment, plasma discharge treatment, UV irradiation treatment, electron beam irradiation treatment, and flame treatment.

<Inorganic Layer>

Substances constituting the inorganic layer are not particularly limited and examples thereof include aluminum, silicon, magnesium, zinc, tin, nickel, titanium, platinum, gold, and silver; oxides, carbides, nitrides, oxycarbides, oxynitrides, and oxycarbonitrides thereof; and mixtures thereof. From the viewpoint that high moisture resistance can be stably maintained, silicon oxide, silicon nitride, silicon oxycarbide, silicon oxynitride, silicon oxycarbonitride, aluminum oxide, aluminum nitride, aluminum oxycarbide, aluminum oxynitride, indium tin oxide (ITO) or mixtures thereof are preferred.

A method for forming an inorganic layer is not particularly limited. In general, methods of forming a thin film are roughly classified into Chemical Vapor Deposition (CVD) and Physical Vapor Deposition (PVD), either of which may be employed. Specific examples of CVD methods include plasma CVD, which utilizes plasma, and Catalyst Chemical Vapor Deposition (Cat-CVD) including catalytically cracking material gas using a heated catalyzer. Specific examples of PVD methods include vacuum deposition, ion plating, and sputtering.

As a method for forming an inorganic layer, Atomic Layer Deposition (ALD) can also be employed. The ALD method is a method for forming a thin film in an atomic layer unit by alternately supplying each of source gases of elements constituting the film to be formed to the surface on which a layer is to be formed. This method, albeit disadvantageous in a slow deposition rate, can more smoothly cover even a surface having a complicated shape than the plasma CVD method and has the advantage that a thin film having fewer defects can be formed. The ALD method also has the advantage that this method can control a film thickness at a nano order and can relatively easily cover a wide surface, for example. The ALD method can be further expected to improve a reaction rate, to achieve a low-temperature process, and to decrease unreacted gas, by using plasma.

(Uses)

The sheet of the present invention is a sheet excellent in transparency and water resistance. From the viewpoint of making use of the properties, the sheet is suitable for purposes such as light transmissive substrates for various display devices, various solar cells, and the like. The sheet is also suitable for purposes such as substrates of electronic equipment, components for home electronics, and window materials, interior materials and outer panels for vehicles and buildings, and packaging materials. Furthermore, not only the sheet is suitable for purposes such as threads, filters, woven fabrics, cushioning materials, sponge, and polishing materials, but also the sheet by itself is also suitable for purposes such as reinforcing materials.

EXAMPLE

Hereinafter, the features of the present invention will be described more specifically with reference to Examples and Comparative Examples. The materials, used amounts, proportions, treatment content, treatment procedures, and the like shown in the following Examples can be appropriately changed to the extent that such changes do not depart from the spirit of the present invention. Therefore, the scope of the present invention should not be construed as being limited by the following specific examples.

Example 1

<Production of Phosphoric Acid Group-Introduced Cellulose Fibers>

As a needle kraft pulp, a pulp manufactured by Oji Paper Co., Ltd. (sheet-like having a solid content of 93% and a basis weight of 208 g/m$^2$, and a Canadian standard freeness (CSF) measured according to JIS P8121 after disintegration of 700 ml) was used. A mixed aqueous solution of ammonium dihydrogenphosphate and urea was impregnated into 100 parts by weight of the needle kraft pulp (absolute dry mass), and the resultant mixture was pressed to 49 parts by mass of ammonium dihydrogenphosphate and 130 parts by mass of urea to obtain a chemical-impregnated pulp. The obtained chemical-impregnated pulp was dried in a dryer at 105° C. to evaporate moisture for pre-drying. Then, the pulp was heated in an air dryer set at 140° C. for 10 minutes to introduce a phosphoric acid group into the cellulose in the pulp, thereby obtaining a phosphorylated pulp.

After 10000 parts by mass of ion-exchanged water per 100 parts by mass of the absolute dry mass of the obtained phosphorylated pulp was poured and stirred for uniform dispersion, a step of obtaining a dehydrated sheet by filtration and dehydration was repeated twice to obtain phosphoric acid modified cellulose fibers. Next, 5000 ml of ion-exchanged water was added to the cellulose into which the phosphoric acid group had been introduced, and the resultant mixture was stirred and washed, and then dehydration was carried out. The dehydrated pulp was diluted with 5000 ml of ion-exchanged water, and a 1 N aqueous solution of sodium hydroxide was gradually added while stirring until the pH was 12 or more and 13 or less to obtain a pulp dispersion. Then, this pulp dispersion was dehydrated and washed with 5000 ml of ion-exchanged water. This dehydration and washing was repeated one more time.

In the obtained phosphoric acid modified cellulose fibers, the amount of the phosphoric acid group introduced was 0.98 mmol/g.

<Machine Treatment>

Ion-exchanged water was added to the pulp obtained after the washing and dehydration to produce a pulp suspension having a solid concentration of 1.0% by mass. This pulp suspension was treated using a wet atomization apparatus ("Ultimizer", manufactured by Sugino Machine Limited) to obtain an ultrafine cellulose fiber dispersion. In the treatment using the wet atomization apparatus, the cellulose dispersion was passed through the treatment chamber five times at a pressure of 245 MPa. The average fiber width of the ultrafine cellulose fibers contained in the ultrafine cellulose fiber dispersion was 3 to 4 nm.

<Sheet Forming>

Polyethylene glycol (manufactured by Wako Pure Chemical Industries, Ltd., molecular weight: 4000000) was added to the ultrafine cellulose fiber dispersion so that the amount per 100 parts by mass of the ultrafine cellulose fibers was 20 parts by mass. Then, polyamine polyamide epichlorohydrin (manufactured by Seiko PMC Corporation, wet strength agent: WS4030) was added so that the amount per 100 parts by mass of the ultrafine cellulose fibers was 0.5 parts by mass. Then, concentration adjustment was performed so that the solid concentration was 0.6% by mass. The dispersion was weighed so that the finished basis weight of the sheet was 45 g/m$^2$, applied onto a commercially available acrylic plate, and dried with a dryer at 70° C. for 24 hours. A metal frame for damming was arranged on the acrylic plate so as to have a predetermined basis weigh. As a result of the above procedure, a sheet was obtained, and the thickness thereof was 30 μm.

Example 2

A sheet was obtained in the same manner as in Example 1, except that the amount of the polyamine polyamide epichlorohydrin added was 2.5 parts by mass.

Example 3

A sheet was obtained in the same manner as in Example 1, except that the amount of the polyamine polyamide epichlorohydrin added was 5 parts by mass.

Example 4

A sheet was obtained in the same manner as in Example 1, except that the amount of the polyamine polyamide epichlorohydrin added was 10 parts by mass.

Example 5

20 parts by mass of polyethylene glycol was added to the ultrafine cellulose fiber dispersion of Example 1. Then, anionic polyacrylamide (manufactured by Seiko PMC Corporation, strength agent: DA4104) was added to the dispersion so that the amount per 100 parts by mass of the ultrafine cellulose fibers was 1.0 part by mass. After 30 seconds of addition of the polyacrylamide, polyamine polyamide epichlorohydrin was added so that the amount per 100 parts by mass of the ultrafine cellulose fibers was 0.5 parts by mass. A sheet was obtained in the same manner as in Example 1, except that sheet forming was made from the dispersion.

Example 6

A sheet was obtained in the same manner as in Example 5, except that the amount of the polyamine polyamide epichlorohydrin added was 2.5 parts by mass and the amount of the polyacrylamide added was 5 parts by mass.

Example 7

A sheet was obtained in the same manner as in Example 5, except that the amount of the polyamine polyamide epichlorohydrin added was 5 parts by mass and the amount of the polyacrylamide added was 10 parts by mass.

Example 8

A sheet was obtained in the same manner as in Example 5, except that the amount of the polyamine polyamide epichlorohydrin added was 10 parts by mass and the amount of the polyacrylamide added was 20 parts by mass.

Example 9

A sheet was obtained in the same manner as in Example 6, except that the polyacrylamide was changed to nonionic (manufactured by Seiko PMC Corporation, strength agent: DH4162).

Example 10

A sheet was obtained in the same manner as in Example 9, except that the amount of the polyamine polyamide epichlorohydrin added was 5 parts by mass and the amount of the polyacrylamide added was 10 parts by mass.

Example 11

A sheet was obtained in the same manner as in Example 9, except that the polyacrylamide was changed to cationic (manufactured by Seiko PMC Corporation, strength agent: DS4433).

Example 12

A sheet was obtained in the same manner as in Example 11, except that the amount of the polyamine polyamide epichlorohydrin added was 5 parts by mass and the amount of the polyacrylamide added was 10 parts by mass.

Example 13

A sheet was obtained in the same manner as in Example 6, except that a polypropylene resin emulsion (manufactured by TOHO Chemical Industry Co., Ltd., HYTEC P-5060P, particle size: 30 nm) was used instead of the polyacrylamide.

Example 14

Undried needle bleached kraft pulp whose dry mass was about 100 parts by mass, 1.6 parts by mass of TEMPO (2,2,6,6-tetramethylpiperidine 1-oxyl) and 10 parts by mass of sodium bromide were dispersed in 10000 parts by mass of water. Next, an aqueous solution of 13% by mass sodium hypochlorite was added to 1.0 g of the pulp so that the amount of sodium hypochlorite was 3.5 mmol, and the reaction was started. The pH was kept at 10 or more and 11 or less during the reaction, with an aqueous solution of 1.0 M sodium hydroxide being dropped, the reaction was determined to be completed at the time where the change in pH was not observed, and a carboxyl group was introduced to the pulp. This pulp slurry was dehydrated to obtain a dehydrated sheet, and then 5000 parts by mass of ion-exchanged water was poured and stirred for uniform dispersion. Then, a step of obtaining a dehydrated sheet by filtration and dehydration was repeated twice, to thereby obtain carboxyl group-modified cellulose fibers. In the obtained carboxyl group-modified cellulose fibers, the amount of the carboxyl group introduced was 1.01 mmol/g. A sheet was obtained in the same manner as in Example 3, except that the cellulose fibers were used for raw materials.

Comparative Example 1

A sheet was obtained in the same manner as in Example 1, except that the polyamine polyamide epichlorohydrin was not added.

Comparative Example 2

A sheet was obtained in the same manner as in Example 14, except that the polyamine polyamide epichlorohydrin was not added.

Comparative Example 3

A sheet was obtained in the same manner as in Comparative Example 2, except that 10 parts by mass of the anionic polyacrylamide was added.

Comparative Example 4

A sheet was obtained in the same manner as in Example 14, except that the amount of the polyamine polyamide epichlorohydrin added was 20 parts by mass.

[Evaluation]

<Methods>

The sheets produced in Examples and Comparative Examples were evaluated according to the following evaluation methods.

(1) Measurement of Amount of Substituent Group on Cellulose Surface (Titrimetry)

The amount of the phosphoric acid group introduced was measured by diluting the cellulose with ion-exchanged water to a content of 0.2% by mass, then treating with an ion-exchange resin, and titrating with alkali. In the treatment with the ion exchange resin, 1/10 by volume of a strongly acidic ion exchange resin (Amberjet 1024: conditioning agent, manufactured by Organo Corporation) was added to a slurry containing 0.2% by mass of the cellulose, and the resultant mixture was shaken for 1 hour. Then, the mixture was poured onto a mesh having 90 μm-apertures to separate the resin from the slurry. In the alkali titration, the change in the electric conductivity value indicated by the slurry was measured while adding a 0.1 N aqueous solution of sodium hydroxide to the slurry containing cellulose fibers after the ion exchange. Specifically, the alkali amount (mmol) required in the first region of the curve shown in FIG. 1 was divided by the solid content (g) in the slurry to be titrated, and the obtained value was taken as the amount (mmol/g) of the substituent group introduced.

The amount of the carboxyl group introduced was determined as the amount (mmol/g) of the substituent group introduced, by dividing the alkali amount (mmol) required in the first region of the curve shown in FIG. 2 (carboxyl group), by the solid content (g) in the slurry to be titrated.

(2) Total Light Transmittance of Sheet

The total light transmittance was measured with a haze meter (HM-150, manufactured by Murakami Color Research Laboratory Co., Ltd.) in accordance with JIS K 7361.

(3) Haze of Sheet

The haze was measured with a haze meter (HM-150, manufactured by Murakami Color Research Laboratory Co., Ltd.) in accordance with JIS K 7136.

(4) Yellowness

The yellowness was measured before and after heating of the sheet, with Colour Cute i (manufactured by Suga Test Instruments Co., Ltd.) in accordance with JIS K 7373.

(5) Tensile Properties of Sheet

The tensile strength, tensile elastic modulus and tensile elongation were measured with a tensile testing machine Tensilon (manufactured by A&D Company, Limited) in accordance with JIS P 8113.

A test piece in measurement was obtained by humidity conditioning at 23° C. and a relative humidity of 50% for 24 hours.

(6) Water Absorption Rate of Sheet

The mass of a 50-mm square sheet immersed in ion-exchanged water for 24 hours was defined as W (g), and subjected to humidity conditioning at 23° C. and a relative humidity of 50% for 24 hours was defined as $W_d$ (g), to determine the water absorption rate according to the following expression.

Water absorption rate (%)=$(W-W_d)/W_d \times 100$

TABLE 1

|  | Functional group | Amount of PAE added [parts by mass] | Resin added | Amount added [parts by mass] | Ionicity | Thickness [mm] | Density [g/cm3] | Total light transmittance [%] |
|---|---|---|---|---|---|---|---|---|
| Example 1 | Phosphoric acid group | 0.5 | PAM | 0 | — | 34.7 | 1.7 | 91.6 |
| Example 2 | Phosphoric acid group | 2.5 | PAM | 0 | — | 33.1 | 1.7 | 91.5 |
| Example 3 | Phosphoric acid group | 5 | PAM | 0 | — | 31.2 | 1.7 | 91.6 |
| Example 4 | Phosphoric acid group | 10 | PAM | 0 | — | 33.1 | 1.7 | 91.4 |
| Example 5 | Phosphoric acid group | 0.5 | PAM | 1 | Anionic | 34.2 | 1.8 | 91.7 |
| Example 6 | Phosphoric acid group | 2.5 | PAM | 5 | Anionic | 32.5 | 1.7 | 91.3 |
| Example 7 | Phosphoric acid group | 5 | PAM | 10 | Anionic | 31.9 | 1.6 | 91.4 |
| Example 8 | Phosphoric acid group | 10 | PAM | 20 | Anionic | 31.2 | 1.7 | 91 |
| Example 9 | Phosphoric acid group | 2.5 | PAM | 5 | Nonionic | 34.9 | 1.6 | 91.8 |
| Example 10 | Phosphoric acid group | 5 | PAM | 10 | Nonionic | 36.3 | 1.6 | 91.8 |
| Example 11 | Phosphoric acid group | 2.5 | PAM | 5 | Cationic | 32.5 | 1.7 | 91.5 |
| Example 12 | Phosphoric acid group | 5 | PAM | 10 | Cationic | 34.7 | 1.7 | 91.7 |
| Example 13 | Phosphoric acid group | 5 | PP | 10 | — | 34.9 | 1.6 | 91.4 |
| Example 14 | Carboxyl group | 5 | PAM | 0 | — | 34.8 | 1.7 | 89.6 |
| Comparative Example 1 | Phosphoric acid group | 0 | — | 0 | — | 34.9 | 1.8 | 91.6 |
| Comparative Example 2 | Carboxyl group | 0 | — | 0 | — | 37.8 | 1.4 | 91.1 |
| Comparative Example 3 | Carboxyl group | 0 | PAM | 10 | Anionic | 35.2 | 1.6 | 88.5 |
| Comparative Example 4 | Carboxyl group | 20 | — | 0 | — | 35.6 | 1.6 | 86.5 |

|  | Haze [%] | Yellowness | Water absorption rate [%] | Tensile properties (humidity conditioning conditions) | | |
|---|---|---|---|---|---|---|
|  |  |  |  | Strength [MPa] | Elastic modulus [GPa] | Degree of elongation [%] |
| Example 1 | 1.2 | 0.78 | 844.2 | 83.92 | 7.91 | 4.14 |
| Example 2 | 0.9 | 0.78 | 246.4 | 86.67 | 7.98 | 3.64 |
| Example 3 | 1.2 | 0.77 | 107.9 | 78.05 | 7.67 | 2.69 |
| Example 4 | 1.3 | 0.92 | 129.4 | 59.00 | 6.41 | 3.35 |
| Example 5 | 0.8 | 0.76 | 444.9 | 92.43 | 9.66 | 4.08 |
| Example 6 | 1.6 | 0.81 | 90.3 | 77.91 | 7.35 | 3.36 |
| Example 7 | 1.3 | 0.88 | 48.9 | 76.38 | 9.80 | 2.13 |
| Example 8 | 2.9 | 1.01 | 22.5 | 77.38 | 7.94 | 3.04 |
| Example 9 | 1.1 | 0.91 | 190.8 | 73.84 | 7.15 | 3.44 |
| Example 10 | 0.9 | 0.72 | 149.6 | 77.71 | 7.27 | 3.77 |
| Example 11 | 1.0 | 0.78 | 219.0 | 85.11 | 7.15 | 4.73 |

TABLE 1-continued

| | | | | | | |
|---|---|---|---|---|---|---|
| Example 12 | 0.9 | 0.91 | 121.4 | 74.44 | 7.68 | 3.28 |
| Example 13 | 0.8 | 0.82 | 136.8 | 133.84 | 9.51 | 5.86 |
| Example 14 | 5.8 | 2.14 | 178.4 | 134.92 | 5.06 | 7.94 |
| Comparative Example 1 | 0.7 | 0.80 | 11600 | 69.97 | 6.91 | 4.24 |
| Comparative Example 2 | 2.1 | 1.60 | 5895 | 121.00 | 4.60 | 12.6 |
| Comparative Example 3 | 6.7 | 2.89 | 670.2 | 134.00 | 5.52 | 9.83 |
| Comparative Example 4 | 17.8 | 4.05 | 45.8 | 101.64 | 4.26 | 9.95 |

As is clear from Table 1, the sheets obtained in Examples are suppressed in water absorption rate, and is low in haze value and also high in total light transmittance. That is, the sheets obtained in Examples can be seen to be excellent in water resistance and transparency.

On the other hand, in Comparative Examples, the sheets obtained do not achieve both of suppression of water absorption rate and a low haze, and there are not obtained any sheets which achieve both of water resistance and transparency.

The invention claimed is:

1. A sheet comprising cellulose fibers having a fiber width of 10 nm or less, and a cationic resin,
   wherein the haze of the sheet is 6% or less,
   the thickness of the sheet is 10 μm or more and 1000 μm or less,
   the yellowness of the sheet measured in accordance with JIS K 7373 is 1.2 or less,
   the cellulose fibers have a phosphoric acid group or a substituent derived from the phosphoric acid group,
   the amount of the phosphoric acid group or the substituent derived from the phosphoric acid group introduced is 0.6 mmol/g or more and 3.0 mmol/g or less,
   the cationic resin comprises polyamine polyamide epihalohydrin, and
   the content of the polyamine polyamide epihalohydrin is 0.5 parts by mass or more and 15 parts by mass or less per 100 parts by mass of the ultrafine cellulose fibers.

2. The sheet according to claim 1, wherein, when the mass of the sheet immersed in ion-exchanged water for 24 hours is defined as W and the mass of the sheet subjected to humidity conditioning at 23° C. and a relative humidity of 50% for 24 hours is defined as $W_d$, the water absorption rate represented by $(W-W_d)/W_d \times 100$ is 5000% or less.

3. The sheet according to claim 1, wherein the total light transmittance is 85% or more.

4. The sheet according to claim 1, wherein the tensile elastic modulus of the sheet subjected to humidity conditioning at 23° C. and a relative humidity of 50% for 24 hours is 5 GPa or more.

5. The sheet according to claim 1, wherein the sheet further comprises a polyacrylamide-based resin.

6. The sheet according to claim 5, wherein the polyacrylamide-based resin is an ionic polyacrylamide-based resin.

7. The sheet according to claim 5, wherein the polyacrylamide-based resin is a nonionic polyacrylamide-based resin.

8. The sheet according to claim 1, wherein the cellulose fibers have an ionic functional group.

* * * * *